Jan. 2, 1962 P. ARBEIT 3,015,190
APPARATUS AND METHOD FOR CIRCULATING MOLTEN GLASS
Filed Oct. 8, 1953 2 Sheets-Sheet 1

INVENTOR.
PIERRE ARBEIT
BY
Bauer and Seymour
ATTORNEY

Jan. 2, 1962 P. ARBEIT 3,015,190
APPARATUS AND METHOD FOR CIRCULATING MOLTEN GLASS
Filed Oct. 8, 1953 2 Sheets-Sheet 2

INVENTOR.
PIERRE ARBEIT
BY
Bauer and Seymour
ATTORNEY

3,015,190
APPARATUS AND METHOD FOR CIRCULATING MOLTEN GLASS
Pierre Arbeit, Paris, France, assignor to Societe Compagnie de Saint-Gobain, Paris, France
Filed Oct. 8, 1953, Ser. No. 384,888
Claims priority, application France Oct. 13, 1952
12 Claims. (Cl. 49—54)

This invention concerns the heating and the treating of molten baths, particularly the making of glass. The invention also includes novel furnaces for carrying out the novel methods. The invention is particularly concerned with means and methods for producing movements and improved heating in the interior of a bath of molten glass or other analogous material, in the course of its treatment. A particularly important phase of the invention concerns the manufacture of glass and the invention will be described herein with particular relation to that industry without detracting from the general applicability of the principles herein set forth to the heat treatment of analogous materials.

In the typical glass furnace for continuous manufacture the glass undergoes the stages of being prepared as crude glass by the melting of solid raw materials, which float on the molten glass at one end of the furnace, of fining in a succeeding zone, which in certain cases may be isolated from the first zone by a wall, and of conditioning, quieting and cooling to a temperature suitable for manufacture into glass articles in a conditioning or working zone which may also be substantially isolated.

In the recently issued patents of Lambert and Arbeit, Nos. 2,597,913 and 2,656,914, it was shown that a material improvement could be made in the manufacture of glass by electrically generating heat within the glass itself between submerged electrodes aimed so as to direct currents of glass upward from the sole of the furnace against the bottom of the lump, in the case of the melting zone, and upward to the surface into the presence of flame in the fining zone.

It is an object of this invention to provide another method and means to generate, direct and control currents of glass in glassmaking furnaces, and currents of other molten materials in other furnaces, whereby to improve the efficiency of such furnaces, the uniformity and quality of the glass produced, and to reach the glass in any desired part of a furnace and apply it to a selected purpose. It is an object to set up definite and controlled paths of circulation in glass furnaces and other furnaces handling molten materials. In this invention the currents are set up in any chosen location at will and involve those regions of the furnace desired.

It is another object of the invention to powerfully accelerate the motion of currents in such furnaces, to establish vertical currents in the most favorable locations, and to establish complementary descending currents in any desired location, even in locations where such currents would not ordinarily be found.

According to the invention, as desired in connection with the manufacture of glass, movements of the glass in a furnace are generated by introducing a gas into the glass within an upwardly directed conduit which communicates with the bulk of the bath by ports, or openings, situated at different levels. The gases serve to reduce the weight of the column of glass within the conduit, establishing a density differential between the glass within the conduit and that outside it, which lifts the glass in the conduit and causes a descending movement outside, which enters by the lower of the orifices, while the bubbly glass, being lighter, escapes from the conduit by an upper opening which is still beneath the upper level of the bath.

The continuous circulation of glass through the conduit, induced by the flow of gas, assures the movement of the glass in that part of the bath outside the conduit. Because the insufflated gas is limited to a very limited quantity of glass, with respect to the great quantity existing in the furnace, and because this bubbly glass is excluded from mingling with the other glass in the furnace by the wall of the conduit, the gases exert their effect more efficiently, generate more rapid and better directed currents and insure a more rapid and more complete heat treatment of the entire contents of the bath.

These movements, established in the bath of glass, can be made to accomplish the rapid elimination of bubbles in the fining operation, or they may be made to homogenize the glass during fining, or to introduce heat exchange between different levels or different zones of the bath, or in particular, between the glass and the raw materials floating on the surface in the melting zone, or between the bath or portions of it and exterior sources of heat acting, for instance, upon its upper surface.

The conduit that serves to set off the portion of the bath into which the gases are introduced may be vertical, or oblique, and may be introduced into the bath either through the upper surface of the bath, through a lateral wall, or through the bottom wall or sole of the furnace. The openings which communicate with the bath may be arranged in the conduit at any desired level, it being understood that the openings of admission, or inlets, are at a lower level than the discharge ports, in order to take advantage of the circulatory effect arising from different densities inside and outside the conduit. The gas may be introduced by a tube opening within the conduit at any selected level of the glass, for instance near the bottom of the furnace where the glass is coldest and where the effect of lowered density achieved by the admission of gas is most desirable. Such tubes can pass through the sole or through any other wall to reach the desired point of discharge within the conduit.

The level of the inlet and discharge orifices can be located in the bath at distances near or remote from the sole according to the effect that it is desired to produce in the molten mass. The conduit may be constructed so as the vary the level at which the openings connect the interior of the conduit with the bath.

The conduit can be constructed of non-conductive refractory material or of electrically conductive refractory material such as carbon, preferably graphite, or a metal resistant to the chemical action of glass, and when so constructed it may be used as an electrode to pass an electric current through the bath to one or more additional electrodes which may themselves be conduits, or not, as desired. By correct selection of the dimensions of the conduit electrode, it is possible to obtain a selected degree of electrical concentration in the bath in the immediate vicinity of the electrode. This concentration of power serves to generate ascending currents of glass adjacent the wall, outside of the conduit, thus adding to the ascensional effect inside the conduit and tending to prevent the glass on the outside of the conduit from being drawn downward to the inlet. The conduit, when acting as an electrode need not be entirely composed of electrically conductive material, but the conductive part may be composed of an exterior revetment extending partly or wholly over the surface. Graphite is an ideal material from which to make the conductive part of the conduit.

The conduit may have any desired shape, but in general that of a cylindrical tube is preferred.

In order to improve the working characteristics of those parts of the furnace that are remote from the conduit, for instance, to beneficiate the glass that is located in a cold spot of the furnace, a horizontal conduit may be extended from the inlet to that portion or zone which it is desired to connect to the inlet. For instance, the glass which is brought to the conduit by the lateral canals may come from colder regions of the bath, for instance, from a zone where the glass lies which has been cooled by the furnace wall. This arrangement augments the effective range of the operating instrumentality and enables it to act upon glass located in remote and possibly previously stagnant portions of the glass mass.

In the accompanying drawings, there are represented embodiments of the invention which illustrate the application of its principles without imposing any limitation upon the generality of what is herein written.

Figure 1:
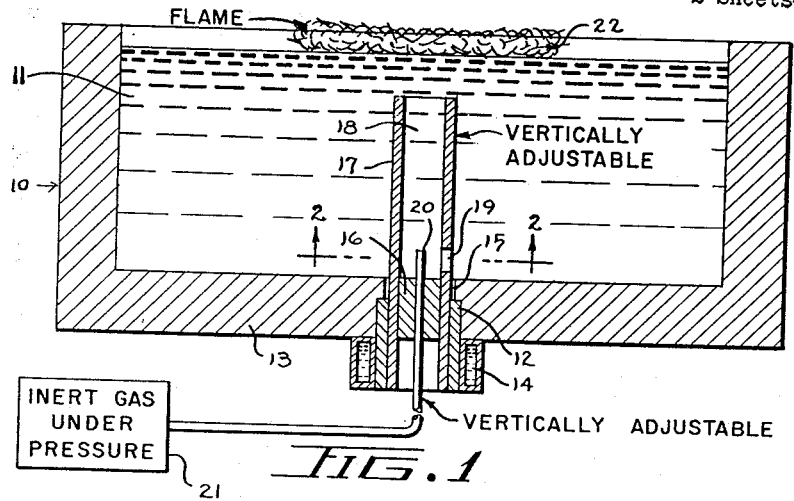
FIG. 1 is a vertical section through a simple form of the invention.
Figures 2, 3, 4:
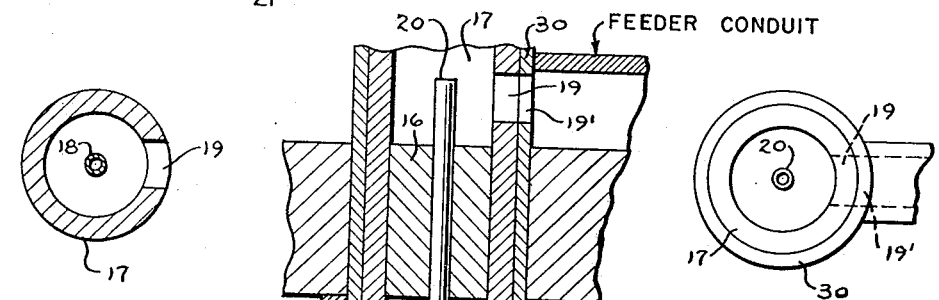
FIG. 2 is a section on the line 2—2 of FIG. 1.
FIG. 3 is a vertical section in detail through a modification.
FIG. 4 is a plan view of the modification of FIG. 3.

Referring now to the numerals of FIGS. 1 and 2, 10 indicates the tank of the furnace holding molten glass 11. Into the bottom of the furnace, a graphite sleeve 12 extends, the portion thereof which extends outside the sole 13 of the furnace being surrounded by a water jacket 14 which serves to cool the sleeve, the internal diameter of the sleeve is somewhat less, and its outer diameter is greater than the diameter of the part 15 of the hole which extends through the sole above the sleeve. The plug 16, made of the same material as the furnace, or of graphite, is firmly fastened within the refractory tubular conduit 17 which is extended through the sleeve 12, which acts as a bearing, and to a position such that its upper end 18 is a short distance below the upper level of the glass. Inlet 19 is provided in the side of the tube just above the sole, and the upper end of the tube acts as a discharge outlet. Through the plug 16 extends a refractory metal or graphite tube 20 which receives gas under pressure from a reservoir 21. The gas may be nitrogen or any inert gas in the case where graphite is used, but may be another gas, such as air or steam in other cases. The numeral 22 indicates flame above the discharge port at 18, which provides in the particular instance, that the bubble filled glass ejected from the tube will discharge its bubbles and become bubble-free as soon as it reaches the surface.

Tube 20 can be moved through the block 16 to the position most favorable with respect to the inlet, being shown as opening just at the upper level of the circular port 19. Thus, the bubbles which fill the glass and reduce its density are confined to that glass which is within the conduit and do not tend to pass out of port 19.

The effect of the invention is to make the glass in the tube lighter so that an ascending current is set up inside the conduit and consequently a descending current outside of it. The velocity of the inner current can be changed by altering the position of tube 20 with respect to the level of orifice 19, and by varying the velocity, or quantity, or both, of the glass injected. The more gas admitted, the lighter the glass in the conduit becomes, the greater the differential between the inner and the outer densities and the greater the internal velocity of the glass.

In FIGS. 3 and 4 is shown a modification of the foregoing principles in which the tube 17 is within a graphite sleeve 30 which is also perforated at 19'. The graphite sleeve 30 is electrified at 31 and acts as an electrode to heat the glass outside the tube 17. The gas itself may be given a preliminary heating before injection which will add to the conditioning of the glass and to its ascensional effect.

The hot graphite sleeve will heat the glass on the outside of the conduit and will tend to prevent it from sinking and will thus permit the orifice 19 to draw almost exclusively from the cold glass at the bottom, and if sufficient power is concentrated at the surface of sleeve 30, will cause the glass outside the tube to ascend in a hot cylinder around the bubbly glass issuing from the upper orifice of the conduit 17.

Figure 5:
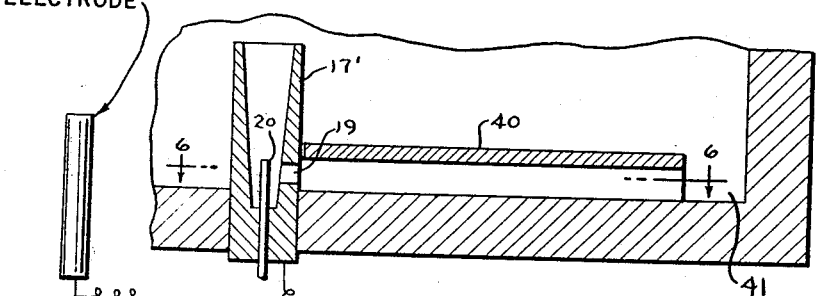
FIG. 5 is a vertical section through another modification.
Figure 6:
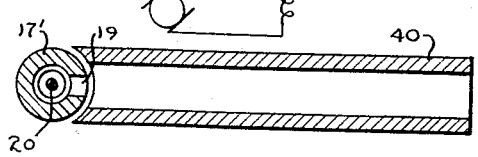
FIG. 6 is a section on the line 6—6 of FIG. 5.

In FIG. 5 is shown another important modification of the invention which enables the effect of the gas conduit to be extended to any desired part or level of the furnace. In this form of the invention the conduit 17' is internally flared and a feeder conduit 40 extends from inlet 19 to a remote part of the furnace 41 which we will presume to be a cold spot in which the glass does not ordinarily receive adequate treatment. The glass is thus drawn from location 41 through conduit 40 and orifice 19 into the conduit 17'. By means of conduits such as 40, glass can be taken from any desired location, artificial convection currents can be established where desired, and the glass can be circulated at will to any chosen location of the furnace. This makes for superior homogeneity.

Figure 7:
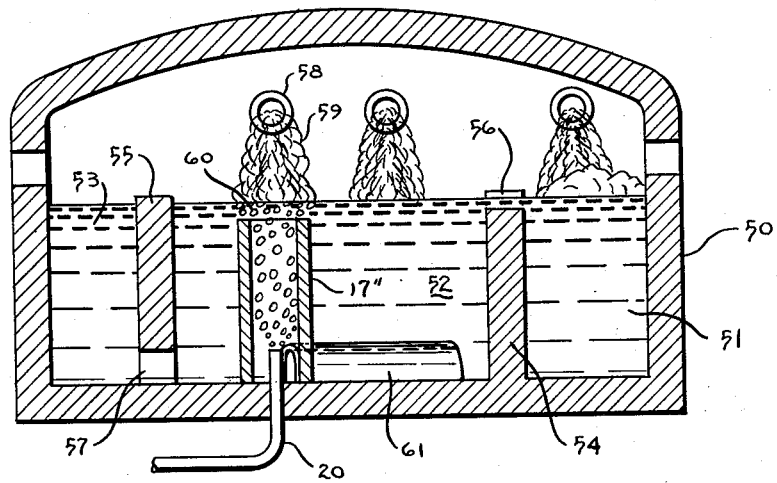
FIG. 7 is a vertical section through a furnace embodying some of the principles of the invention.

In FIG. 7 is shown a furnace 50 having a melting zone 51, a fining zone 52 and a working zone 53, separated by walls 54 and 55. A narrow shallow channel 56 communicates between the melting and fining zones and a submerged throat 57 communicates between the fining and working zones. A tube 17" extends upward from the sole of the furnace to a position directly below a burner 58, the flames 59 of which play upon the bubbly glass 60 as it issues from the conduit 17". A lateral conduit 61 brings glass from a cold part at the bottom of the fining zone near the longitudinal wall of said zone into the conduit 17" where it is insufflated by tube 20 and rises to the surface.

Figure 8:
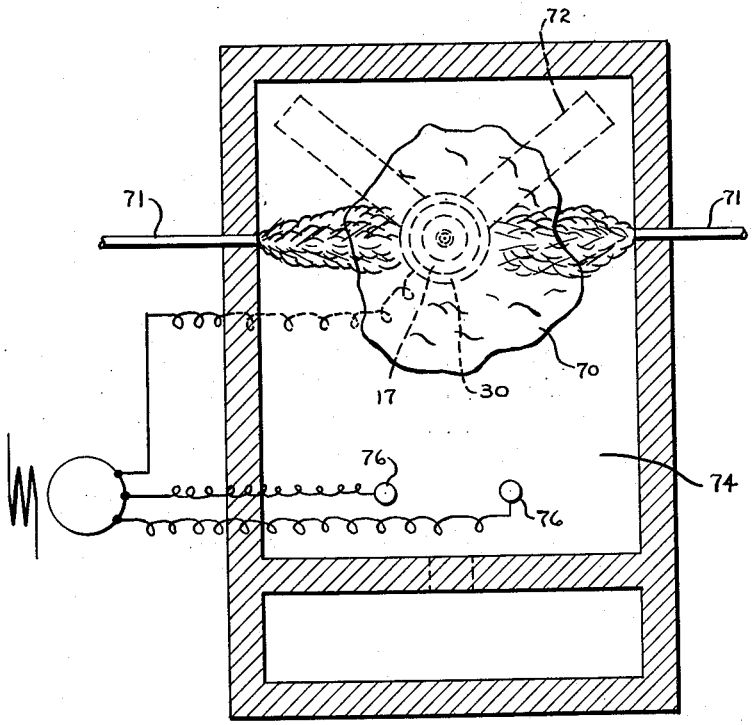
FIG. 8 is a plan view of another furnace embodying the principles of the invention.

In FIG. 8 is a plan view of an installation of a tube of the type shown in FIG. 3, which is located beneath the lump 70 of solid raw materials which are undergoing melting by flame from burners 71. Two lateral conduits 72 and 73 take cold glass from remote corners of the melting zone and deliver it to the bottom of tube 17. Gases insufflate the glass and drive it upward, against the bottom of the lump so that the lump undergoes usury from above and below. The tube 17 is provided with a conducting coating 30 which acts as an electrode cooperating with other electrodes 76 situated in the fining zone of the furnace to heat the glass outside the tube. Coating 30 and electrodes 76 are supplied with current from a generator, as shown. These electrodes are supplied with triphase current by generator 77.

The invention includes a process for producing movements inside a bath of melted glass or analogous materials and it comprises introducing gas into an isolated portion of the bath, which is separated from the bath by a conduit which communicates with the bath through openings situated at different levels, in which the insufflated, bubbly glass, being lighter than that outside the conduit, is displaced by the glass outside which is denser and penetrates the conduit through an opening at a lower level, is itself insufflated and discharged from an upper opening.

The invention also involves an apparatus which has the following features of novelty alone or in combination:

A conduit is provided which is preferably upwardly directed and which is preferably vertical or oblique and which can enter the bath from any direction, but preferably enters through the sole of the furnace; gases are introduced into the glass in the interior of the conduit by one or more tubes opening at any selected level; the conduit itself and the gas tube are adjustable in height; the conduit may be flared upwardly; the conduit may be supplied by lateral conduits extending to any portion of the bath; the conduit may be used as an electrode to produce a concentration of power about the conduit, or within it and to induce the formation of an ascending glass current within or without the conduit; the conduit or part of it may be electrically conductive, for instance, made of graphite or of a metal which is refractory and resistant to the attack of glass. Such metals are known and have been used in glass furnaces for other purposes. Other forms of carbon may be used, but graphite is preferred.

Among the advantages of the invention are the ability to generate glass currents in predetermined localities and direction in particular for accelerating convection currents or eventually for neutralizing undesirable convection currents, this effect being obtained by means independent from the heating means of the furnace. The ability to draw glass from cold spots of the furnace to improve the homogeneity of the product; the movement which is thus established in the glass bath improves the physical and chemical homogenization of the molten glass and may be used to (1) facilitate the heat exchange between the bath and a heating source above the bath such as flames or the floating raw materials by producing a continuous renewal of the glass in the upper layers of the bath undergoing the action of the flames or in contact with the raw materials.

(2) To render fining, or melting easier; it may also be used.

As many apparently widely different embodiments of the present invention may be made without departing from the spirit and scope thereof, it is to be understood that the invention is not limited to the specific embodiments.

What is claimed is:

1. A glass furnace comprising an upwardly extending conduit immersed in molten glass in the furnace, port means in said conduit within the furnace to admit said molten glass to the conduit at a lower level, a feeder conduit within the furnace connected to the port means, outlet means in the conduit within the furnace to discharge the molten glass at an upper level, gas admission means opening into said conduit, and means to supply said admission means with gas.

2. The furnace of claim 1 which the conduit is electrified and acts as an electrode.

3. The furnace of claim 1 in which the conduit has inner and outer parts of which one is graphite.

4. A glass furnace having a sole, a graphite bearing extending into the sole, a vertically adjustable tubular conduit extending through the bearing and the sole and into the furnace, an intake port in said conduit near the sole, a discharge port in said conduit above said port and below the glass level, a vertically adjustable gas discharge tube penetrating the sole within the conduit having a discharge port above the said intake port, means to supply said tube with inert gas, a horizontal conduit extending along the sole and opening into the said intake port at one end and into the furnace at a place distant from said intake port, said vertical conduit comprising an electrode encircling a refractory tube, and means to electrify said electrode.

5. The furnace of claim 1 in which the conduit is upwardly flared.

6. The method of generating continuous currents in a pool of molten glass, that comprises forming within said pool of molten glass, and mainly beneath the normal upper surface thereof an upwardly extending column of molten glass isolated from the remainder of the glass in the pool which communicates with the remainder of said pool only at different levels, said isolated column being laterally extended at the lower of said levels, and circulating the glass in said pool by insufflating the said column with a gas.

7. The method of claim 6 in which the column is supplied by a laterally extending, isolated channel extending to a distance from the lower of said levels.

8. The method of claim 6 in which the column is in the melting zone of the furnace beneath a floating lump of raw materials.

9. The method of claim 6 in which the column is in the fining zone of the furnace.

10. The method of claim 6 in which the column of insufflated glass is simultaneously heated.

11. The method of claim 6 in which the molten glass surrounding the column of insufflated glass is simultaneously heated.

12. The method of claim 6 in which the current of molten glass is produced within a zone of the pool heated by an exterior heating source acting above the pool.

References Cited in the file of this patent

UNITED STATES PATENTS

| | | |
|---|---|---|
| 1,583,141 | Greenawalt | May 4, 1926 |
| 1,921,060 | Williams | Aug. 8, 1933 |
| 2,038,221 | Kagi | Apr. 21, 1936 |
| 2,263,549 | Peyches | Nov. 18, 1941 |
| 2,331,952 | Shadduck | Oct. 5, 1943 |
| 2,636,914 | Arbeit | Apr. 28, 1953 |
| 2,658,096 | Peyches | Nov. 3, 1953 |
| 2,762,167 | De Voe | Sept. 11, 1956 |

FOREIGN PATENTS

| | | |
|---|---|---|
| 711,976 | France | July 8, 1931 |

UNITED STATES PATENT OFFICE
CERTIFICATE OF CORRECTION

Patent No. 3,015,190                          January 2, 1962

Pierre Arbeit

It is hereby certified that error appears in the above numbered patent requiring correction and that the said Letters Patent should read as corrected below.

In the grant, line 2, for "Societe Compagnie de Saint-Gobain, of Paris, France," read -- Compagnie de Saint-Gobain, of Neuilly, France, --; line 11, for "Societe Compagnie de Saint-Gobain, its successors" read -- Compagnie de Saint-Gobain, its successors --; in the heading to the printed specification, lines 4 and 5, for "Societe Compagnie de Saint-Gobain, Paris, France" read -- Compagnie de Saint-Gobain, Neuilly, France --.

Signed and sealed this 24th day of July 1962.

(SEAL)

Attest:

ERNEST W. SWIDER
Attesting Officer

DAVID L. LADD
Commissioner of Patents